July 25, 1950 R. T. MARTIN 2,516,133
FISHING DEVICE

Filed Jan. 14, 1948 2 Sheets-Sheet 1

Inventor

Robert T. Martin

By Clarence A. O'Brien
and Harvey B. Jacobson
Attorneys

July 25, 1950  R. T. MARTIN  2,516,133
FISHING DEVICE
Filed Jan. 14, 1948  2 Sheets-Sheet 2
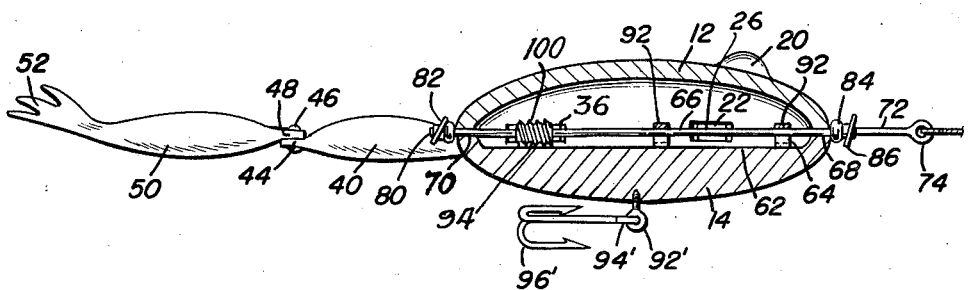
Fig. 3.
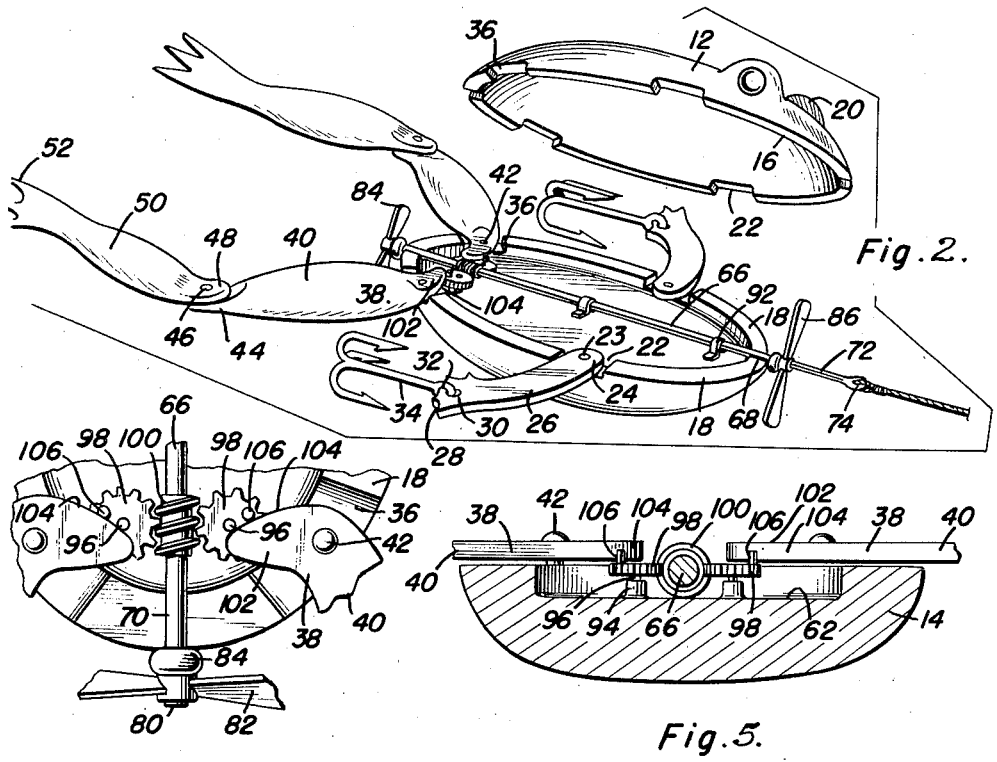
Fig. 2.
Fig. 4.  Fig. 5.
Inventor
Robert T. Martin
By *Clarence A. O'Brien and Harvey B. Jacobson*
Attorneys Patented July 25, 1950

2,516,133

UNITED STATES PATENT OFFICE 2,516,133

FISHING DEVICE

Robert T. Martin, Salem, Oreg.

Application January 14, 1948, Serial No. 2,269

7 Claims. (Cl. 43—42.01)

This invention relates to new and useful improvements in fishing devices and the primary object of the present invention is to provide a bass plug, or lure, having the appearance of a frog and which will simulate the movement of a frog when pulled through a fluid medium, thus attracting fish thereto.

Another important object of the present invention is to provide a fishing device including a body, a pair of rear legs and novel and improved means for imparting an oscillatory motion to the rear legs as the body is pulled through a fluid medium.

A further object of the present invention is to provide a fishing device including a rotatable shaft, a plurality of pivoted legs and novel and improved connecting means between the legs and shaft for oscillatory movement of the legs resulting from a rotary motion of the shaft.

A still further aim of the present invention is to provide a fishing device that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a group perspective view of the present fishing device;

Figure 3 is a longitudinal vertical sectional view taken substantially through the center of Figure 1;

Figure 4 is an enlarged fragmentary plan view of the rear portion of the fishing device, and showing the manner in which the rotatable shaft is operatively connected to the rear legs;

Figure 5 is an enlarged transverse vertical sectional view taken substantially on the plane of section line 5—5 of Figure 6.

Figure 1:
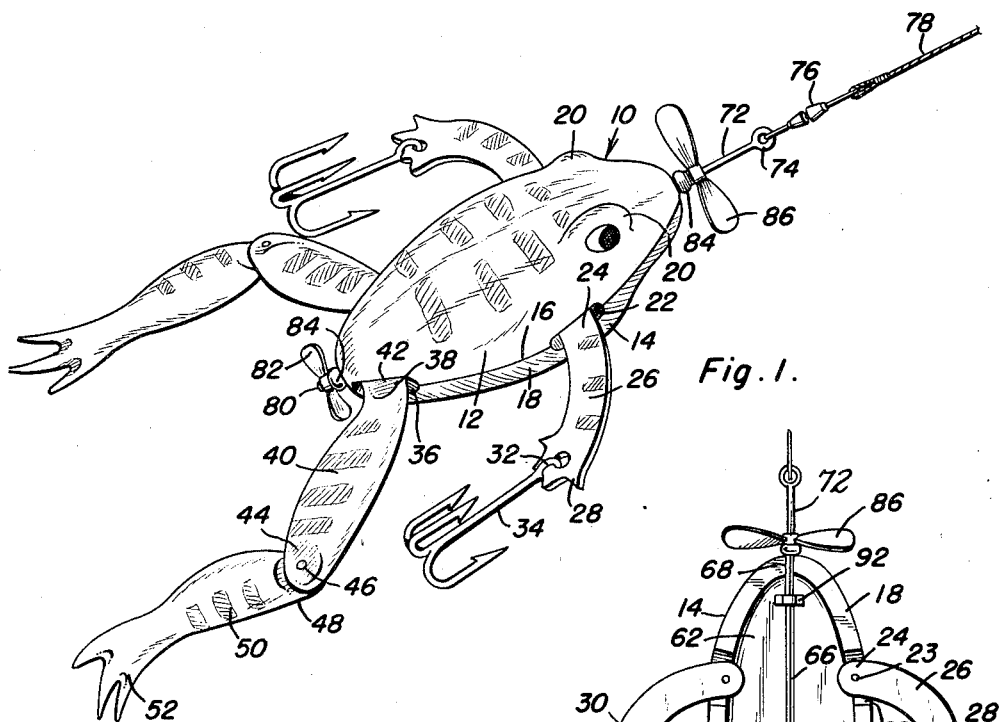
Figure 1 is a perspective view of the fishing device constructed in accordance with the present invention.

Referring now to the drawings in detail, wherein for the purpose of illustration, there is disclosed a preferred embodiment of the present invention, the numeral 10 represents the elongated hollow body portion of the present fishing device generally, comprising an upper portion 12 and a lower portion 14, having abutting edges 16 and 18 that are rigidly secured to each other by any suitable means such as cement. It is preferred, that the outer periphery of the upper portion 12 be provided with protuberances 20 simulating eyes and thereby adding to the attractiveness of the device in conforming to the appearance of a frog.

Pivotally mounted in opposed notches 22 provided in the abutting edges 16 and 18 of the upper and lower portions 12 and 14, adjacent the forward ends thereof, by pins or the like 23, are the inner terminals 24 of arcuate substantially flat forward legs 26 having undulated outer extremities 28. Apertures 30 provided in the legs 26, adjacent the terminals 28, pivotally engage the eye portions 32 of a pair of side gang of hooks 34.

Opposed notches 36 are also provided in the abutting edges 16 and 18 of the portions 12 and 14 adjacent the rear ends thereof, and these latest notches 36 loosely receive the inner terminal 38 of a pair of inner rear leg sections 40, that are pivoted in said notches 36 by pins or the like 42. The outer terminals 44 of these legs 40 are pivoted by pins or the like 46 to the innermost terminals 48 of outer rear leg sections 50, preferably having undulated or toothed free extremities 52.

Integrally formed with the inner periphery of the portion 14, adjacent the forward end thereof, is a bearing surface 62 that supports a pair of longitudinally spaced bearings or eye members 92 in which there is journaled a rotatable shaft 66 that loosely engages opposed recesses 68 and 70 provided in the abutting edges 16 and 18 of the portions 12 and 14, adjacent the forward and rear ends thereof. The forward terminal 72 of the shaft projects outwardly from the body 10 and terminates in an eye 74 that is connected to a swivel 76 at one end of a flexible line 78. The rear terminal 80 of the shaft 66 projects outwardly from the rear end of the body 10 and is provided with a fixed rear propeller 82. Suitable bearings or washers 84 are carried by the outer terminals 72 and 80 of the shaft and by the shaft adjacent the eye members 64, to facilitate the shaft to rotate freely within the body. A forward propeller 86 is also fixed to the forward terminal 72 of the shaft 66 to assist in rotating the shaft when the body is pulled through a fluid medium.

It is preferred, that an eye fastener 92' be secured to the outer periphery of the portion 14, at the longitudinal center thereof, and that the eye fastener engages the eye portion 94' of a lower gang of hooks 96'.

Obviously, the body 10, legs 26 and the sections 40 and 50 may be suitably colored or painted so that the same will resemble the appearance of an attractive lure for bass and the like, and more particularly the natural coloring of a frog.

Figure 6:
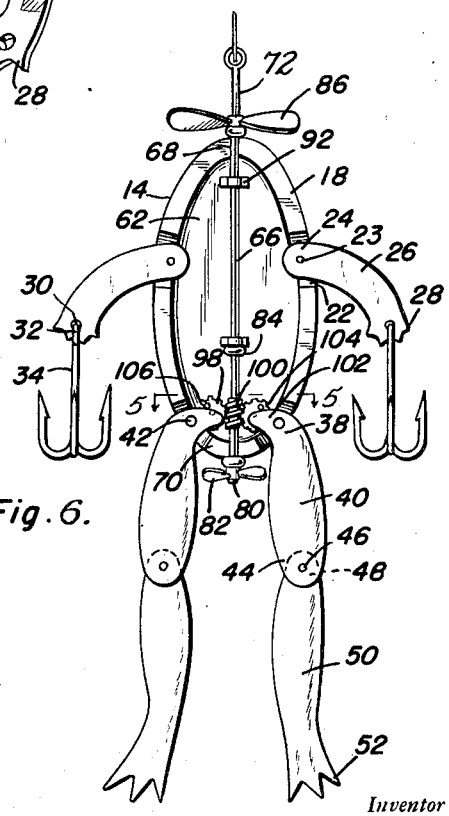
Figure 6 is a plan view of the fishing device and showing the upper portion of the body removed therefrom.

Reference is now directed to Figures 4–6 inclusive, wherein there is disclosed a means for transforming the rotary motion of the rotatable shaft 66 to oscillate the rear leg sections 40 and 50. The bearing surface 62 extends the full length of the lower portion 14 and supports the brackets 92 that journally support the shaft 66.

Journaled for rotation in hubs 94 fixed on the surface 62, is a pair of rotatable pins 96 supporting cog wheels or annular gears 98 that are intermeshed with a worm gear 100 fixed on the shaft 66.

The inner terminal 38 of the inner rear leg sections 40 are provided with arcuate extensions 102 having cam surfaces 104 that engage cam pins 106 carried by the gears 98. In practical use of the present invention, as the body 10 is pulled through a fluid medium, the propellers 82 and 86 rotate causing the shaft 66 to likewise rotate, worm gear 100 effects a rotation of the gears 98 in an opposite direction, and the pins 106 bear against surfaces 104 causing a forward swinging movement of the rear leg section 40 which in turn imparts an oscillatory motion to the outer rear leg section 50 freely about the pivot points 46. After the pins 106 have cleared the surfaces 104 and the fishing device is pulled forwardly through a fluid medium, the resistance of the fluid medium acting upon the rear leg sections 40 will cause the rear leg sections to swing rearwardly until the pins 106 again ride against the surfaces 104.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing device comprising a body portion, legs pivotally mounted on said body portion, means limiting the pivotal movement of said legs in both directions, and means for actuating said legs as the body is pulled through a fluid medium, said last mentioned means including a drive shaft journalled in said body portion, a pair of gears driven by said shaft, cams carried by said legs, and pins mounted on said gears contacting said cams.

2. A fishing device comprising a body portion, a pair of forward legs pivoted on said body portion for forward and rear pivotal movement, a pair of rear legs pivoted on said body portion for forward and rear pivotal movement, said rear legs having cam surfaces, means limiting the pivotal movement of said forward legs and rear legs in both directions, and means for actuating said rear legs as the body portion is pulled through a fluid medium, said last mentioned means including a drive shaft, and a pair of rotary members driven by said shaft, said members including eccentrically mounted pins contacting said cam surfaces.

3. A fishing device comprising a hollow body, a pair of forward arms pivoted on said body for forward and rear movement, a pair of rear legs pivoted on said body for forward and rear movement, said rear legs including inner and outer pivotal sections, and means for actuating said rear legs as the body is pulled through a fluid medium, said last mentioned means including a drive shaft, propellers mounted on said shaft for imparting rotation to the shaft as the same is pulled through a fluid medium, a pair of rotatable members mounted within said body, a drive connection between said members and said drive shaft, said rear legs having cam surfaces disposed within the body, and eccentrically mounted pins on said rotatable members contacting said cam surfaces.

4. A fishing device comprising an elongated hollow body including an upper half and a lower half having abutting edges which are secured to each other, the abutting edges of said halves adjacent the forward end of said body having opposed notches, forward legs pivoted in said notches for limited forward and rear movement, the abutting edges of said halves adjacent the rear end of said body having further opposed notches, a pair of rear legs, each rear leg including an inner section and an outer section pivoted on said inner section, said inner section being pivoted in said further notches for limited forward and rearward movement, and means for actuating said rear legs as the body is pulled through a fluid medium, said means including a pair of rotatable members, pins carried by said members, said rear legs having cam surfaces contacted by said pins, and means carried by the body for rotating said members.

5. The combination of claim 4 wherein said last named means includes a longitudinal shaft journaled for rotation in said body, said shaft having a forward terminal and a rear terminal, the forward and rear terminals of said shaft projecting outwardly from said body, a forward propeller fixed on the forward terminal of said shaft, a rear propeller fixed on the rear terminal of said shaft, and means operatively connecting said shaft to said rotatable members.

6. The combination of claim 5 wherein said means includes a gear mounted on said shaft, said rotatable members having toothed edges engaging said gear.

7. A fishing device comprising an elongated body having a pair of slots therein, a pair of legs pivoted to the walls of the slots for swinging movement, a longitudinally extending shaft journalled in said body, means mounted on said shaft and disposed exteriorly of said body for imparting rotation to the shaft as the body is pulled through a fluid medium, a pair of rotatable gears housed within the body and journalled on the body for rotation, lugs eccentrically mounted on said gears, said legs having cam surfaces engaging said lugs, and a drive gear carried by the shaft and engaging said pair of gears.

ROBERT T. MARTIN.

REFERENCES CITED

The following references are of record in the file of this patent:

UNITED STATES PATENTS

| Number | Name | Date |
| --- | --- | --- |
| 638,885 | Peterson | Dec. 12, 1899 |
| 978,290 | Heatly | Dec. 13, 1910 |
| 1,390,601 | Caldwell | Sept. 13, 1921 |
| 1,746,753 | Whitney | Feb. 11, 1930 |
| 2,224,389 | Haselwood | Dec. 10, 1940 |